United States Patent [19]

Mikonis

[11] 3,988,682

[45] Oct. 26, 1976

[54] VOLTAGE RAMP TEMPERATURE CONTROLLER

[75] Inventor: Paul Mikonis, Ridgecrest, Calif.

[73] Assignee: The United States of America as represented by the Secretary of the Navy, Washington, D.C.

[22] Filed: June 23, 1975

[21] Appl. No.: 589,160

[52] U.S. Cl. .................................. 328/3; 307/310; 307/228; 219/501
[51] Int. Cl.² ....................... G01K 7/00; H05B 1/02
[58] Field of Search ............... 328/3; 307/310, 228, 307/229, 237; 219/501, 505, 496

[56] References Cited
UNITED STATES PATENTS

| | | | |
|---|---|---|---|
| 3,566,151 | 2/1971 | Wilburn | 219/501 |
| 3,743,930 | 7/1973 | Fathauer | 328/3 |
| 3,819,960 | 6/1974 | Kohn, et al. | 219/501 |

Primary Examiner—Stanley D. Miller, Jr.
Assistant Examiner—B. P. Davis
Attorney, Agent, or Firm—R. S. Sciascia; Roy Miller

[57] ABSTRACT

A temperature control circuitry for use in detecting the temperature of a device and providing a programming voltage output for controlling a heating apparatus to vary the temperature of the device. The circuitry utilizes a thermocouple as a sensing element in conjunction with a sweep voltage generator and is capable of controlling the time required to heat the device, depending on its material, to a specific temperature over a wide range of temperature values. This is accomplished by superimposition of the thermocouple voltage of the device on a linear ramp voltage generated by the sweep voltage generator. The error signal produced is further processed to control the output of power supplied to heating elements in order that a linear temperature rise or fall of the heated device results over a predetermined elapsed time.

8 Claims, 2 Drawing Figures

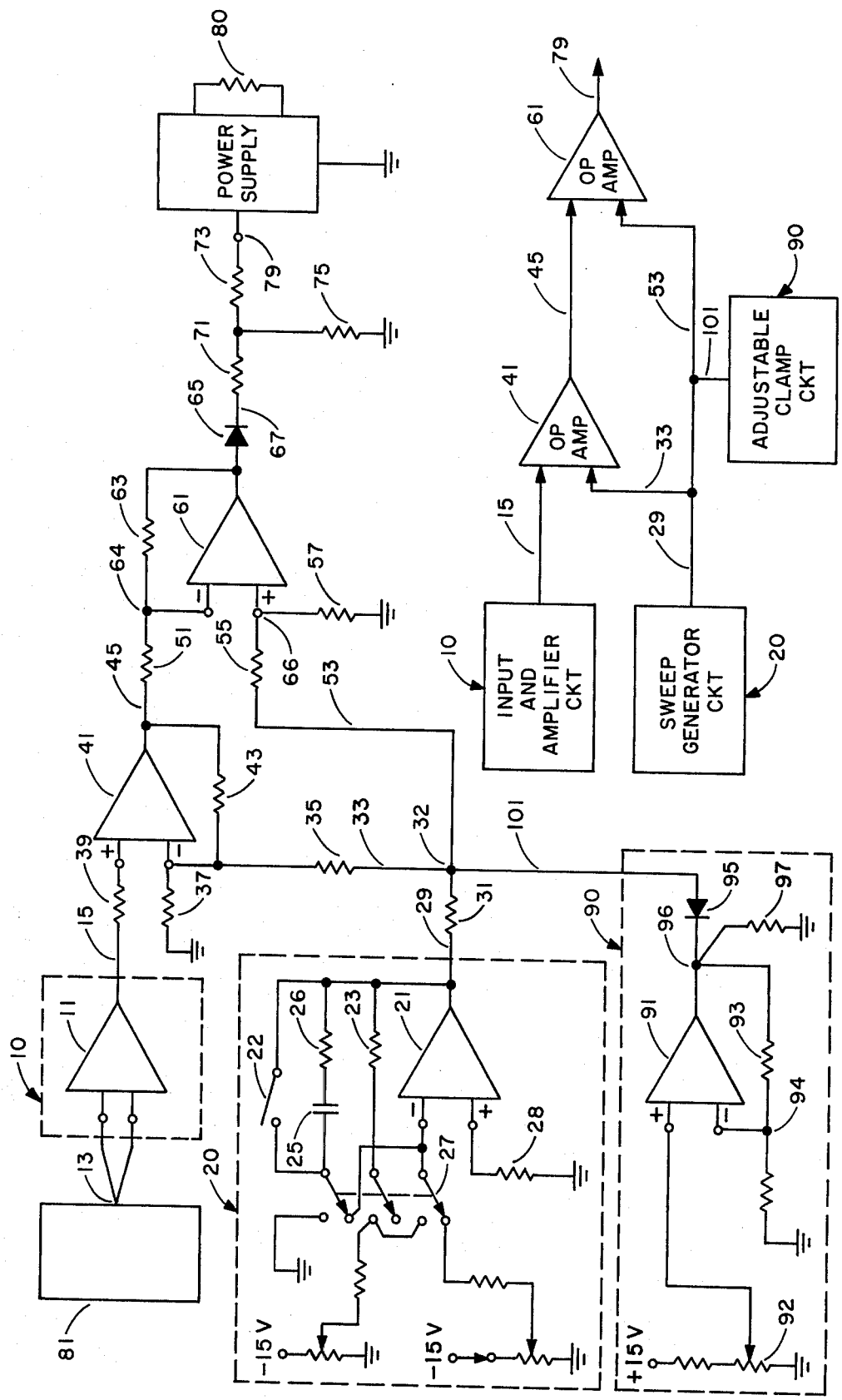

VOLTAGE RAMP TEMPERATURE CONTROLLER

BACKGROUND OF THE INVENTION

This invention relates to temperature control circuits and in particular to a control circuit for supplying a programmed voltage to a power supply connected to a heater, in order that a predetermined temperature from the heater occurs over an elapsed time period.

PRIOR ART

In the prior art, devices used to control the voltage to a heater develop an error signal and then reference the error signal with an externally generated sweep voltage. As a result, the amount of voltage applied to the heater is dependent on an outside variable and is not accurately responsive to deviations from the predetermined temperature sweep voltage requirement.

By summing a portion of the sweep voltage used to control the heater voltage to develop the error signal required and then summing the error signal with the sweep voltage a control signal is generated that accurately responds to deviations from the predetermined temperature sweep.

SUMMARY OF THE INVENTION

The present invention is an apparatus for providing a control signal to a heater power supply whereby the temperature linearly follows a predetermined sweep voltage. A portion of the sweep voltage signal and an output voltage developed at the heated device by a thermocouple are summed in an operational amplifier to develop an error signal. The error signal and the sweep voltage signal are then summed in a second operational amplifier to provide the control signal supplied to the heater power supply. By this method a thermocouple emf is generated that is linear to the sweep voltage signal.

BRIEF DESCRIPTION OF THE DRAWINGS

FIG. 1 is a block diagram of an embodiment of the present invention;

FIG. 2 is a schematic diagram of an embodiment of the present invention.

Referring now to the drawings, more particularly to FIG. 1, the present invention has a sweep generator circuit 20 coupled to a first and a second operational amplifier 41 and 61. The system input on line 15 and the sweep generator circuit output from line 29 are coupled to first operational amplifier 41 for providing an error signal output over line 45. Error signal output connected over line 45 and the sweep generator circuit output over line 29 are coupled to second operational amplifier 61 which provides the system control signal output at 79.

Referring to FIG. 2, a schematic diagram of the embodiment, including sweep generator circuit 20, first and second operational amplifiers 41 and 61, an adjustable clamp circuit 90 and the system output 79, is shown.

In the embodiment, a programable direct current power supply is coupled to a heater element 80. Heater element 80 is coupled via conduction or convection to a device 81. A thermocouple 13 attached to device 81 is coupled to the input of isolation amplifier 11. Isolation amplifier 11 has its output coupled via line 15 and impedance matching resistor 39 to the first operational amplifier 41.

The sweep generator circuit 20, shown in this embodiment as a linear ramp generator, has a mode switch 27 with two sets of contacts and is coupled to operational amplifier 21. One set of mode switch 27 contacts couples the feedback of operational amplifier 21 through capacitor 25 and resistor 26. The other set of switch 27 contacts couples the feedback of operational amplifier 21 through resistor 23. A switch 22 is coupled in parallel with feedback capacitor 25 and resistor 26. An input resistor 28 is coupled between operational amplifier 21 and ground.

The sweep generator output over lead 29 is coupled through a current limiting resistor 31, to junction 32. A branch from this junction leads via current setting resistor 35 to first operational amplifier 41. An input and gain setting resistor 37 couples one side of operational amplifier 41 to ground potential. Another branch couples junction 32 to an input of a second operational amplifier 61 through current line 53 and resistor 55. Resistor 57 couples from one side of resistor 55 and ground potential.

The error signal output via lead 45 is coupled to the second operational amplifier 61 through an input resistor 51 and junction 64. A feedback resistor 43 is coupled between the first operational amplifier output and the input to the first operational amplifier 41.

A feedback resistor 63 is coupled between the second operational amplifier 61 output and its input through junction 64. Impedance matching resistor 57 couples one side of the input of second operational amplifier to ground potential via junction 66.

The output, via line 67, of the second operational amplifier 61 is coupled through a diode 65, a voltage dividing resistive network 71 and 75 and a current limiting resistor 73 to the control terminals of a programable direct current power supply as control signal output at 79. In the depictive embodiment, an adjustable clamp circuit 90 is shown having an operational amplifier 91 with an output lead 101 coupled to junction 96, a feedback resistor 93 coupled between junction 96 and an input to operational amplifier 91 through junction 94, a current supply resistor 97 coupled between junction 96 and ground potential, a potentiometer 92 coupled to an input of operational amplifier 91 and a clamping diode 95 coupled between junction 96 and junction 32.

In operation switch 27 is positioned to place resistor 23 in the feedback path of sweep circuit 20, thus causing operational amplifier 21 to be configured as a unity gain amplifier to set the initial or start point condition into the system. Upon reaching the start point, which is a predetermined temperature equal to or greater than the ambient temperature, switch 27 is repositioned placing capacitor 25 and resistor 26 in the sweep circuit 20 feedback loop and configuring operational amplifier 21 as an integrator to produce a linear voltage ramp output over lead 29. A portion of the sweep generator output is fed via lead 33 into the first operational amplifier 41 which operates as a non-inverting summation device.

A thermocouple 13 is attached to the device whose temperature is to be raised to provide an output voltage from the thermocouple that is proportional to the device temperature. This voltage is coupled to the input of amplifier 11 which operates as an isolation amplifier having a fixed predetermined gain. The output of amplifier 11 is coupled to first operational amplifier 41 via line 15. A portion of the sweep generator ramp voltage output from operational amplifier 21 appears across input and gain setting resistor 37 which has one side coupled to the input of operational amplifier 41 and its other to ground potential. Both of these voltages are algebraically summed for providing an output that is a non-inverted error signal. The output of operational amplifier 41 is a voltage which will be a positive direct current voltage if the thermocouple voltage is higher than the ramp voltage appearing across resistor 37. On the other hand, if the thermocouple voltage is lower than the ramp voltage across resistor 37 than there will be a negative voltage output from operational amplifier 41. This output voltage is fed to the input of operational amplifier 61 where it is summed with the magnitude of sweep voltage appearing across input resistor 55 that is coupled between junction 32 and the input to operational amplifier 61. The impedance of operational amplifier 61 and its input are matched by resistor 57 that is coupled between input and ground potential.

The error signal and sweep voltage are summed in operational amplifier circuitry 61 which operates in an inverting configuration to furnish an output signal that is coupled across a resistor diode network and ground potential. This voltage appearing at 79 is a programming voltage output that is applied to a programable direct current power supply for controlling its output voltage. Normally the voltage is coupled to a resistive heater device for supplying variable power to the heater to either increase or decrease the temperature of the heater thus causing a device exposed to the heat to increase or decrease linearly in temperature by a predetermined amount during an elapsed period of time.

Operational amplifier 91 with its associated resistor 97 and diode 95 network provides an adjustable clamp voltage at junction 32 to control the upper limit of the ramp voltage. Variable resistance 92 controls the magnitude of clamp voltage and is adjusted to a predetermined level before operation of the temperature control circuit.

The time required to heat a device by the heater element or elements to a specific temperature is determined by the slope of the ramp voltage and the type of thermocouple used. The slope of the ramp voltage can be positioned so as to have a number of predetermined fixed values with at least one variable value. Sweep time of the ramp can be selected to vary over a wide range of times. Thus time selection together with the adjustable upper limit determined by setting variable resistor 92 enables the control circuitry to operate over a wide range of heating rates. In addition, the adjustable resistors in sweep generator circuit 20 allows the starting current to be adjusted so that it is possible to program the heating over any desired range.

The circuitry is capable of producing a linear temperature rise of a device to be heated with very negligible variation in linearity.

Although an embodiment has been described, it will be understood that within the perview of this invention various changes may be made in form, details, proportion and arrangement of parts, the combination thereof and mode of operation which generally stated consist in a device capable of carrying out the objects set forth, as disclosed and defined in the appended claims.

What is claimed is:

1. An electronic circuit providing an output control signal that is in direct relation to an input signal, comprising:

an input signal having a rate of change;
means for generating a sweep voltage signal which varies in a predetermined fashion between a first preselected voltage and a second preselected voltage over a preselected time period;
first summing means having said sweep voltage signal and said input signal operatively coupled thereto for summing said sweep voltage and input signals to provide an error signal output, said error signal having an amplitude directly related to any deviation between said input and sweep voltage signals;
second summing means having said error signal output and said sweep voltage signal operatively coupled thereto for summing said error and sweep voltage signals to provide a control signal output operative to control the rate of change of said input signal.

2. The circuit of claim 1 wherein said first summing means comprises;
an operational amplifier having a non-inverted output, and
a resistive feedback path coupled between the input and output of said operational amplifier whereby said operational amplifier algebraically adds said input signal and sweep voltage signal.

3. The circuit of claim 1 wherein said first summing means comprises:
an integrated circuit containing a non-inverting operational amplifier having resistive feedback wherein the inputs to said integrated circuit are algebraically added to provide an output.

4. The circuit of claim 1 wherein said second summing means comprises:
an operational amplifier having an inverted output, and
a resistive feedback path coupled between the input and output of said operational amplifier whereby said operational amplifier algebraically adds said input signal and sweep voltage signal.

5. The circuit of claim 1 wherein said second summing means comprises:
an integrated circuit containing an inverting operational amplifier having resistive feedback wherein the inputs to said integrated circuit are algebraically added to provide an output.

6. An electronic temperature control circuit which provides an output control signal in direct relation to the temperature of a device being heated to cause a predetermined change in the temperature of said device, comprising:
temperature sensing means attached to said device for providing an output signal proportional to the temperature sensed;
means for generating a sweep voltage signal, which varies in a predetermined fashion between a first preselected voltage and a second preselected voltage over a preselected time period;
first summing means having said temperature sensing means output signal and said sweep voltage signal operatively coupled thereto for summing said temperature sensing means output and sweep voltage signals to provide an error signal output, said error signal having an amplitude directly related to any deviation between said temperature sensing means output and said sweep voltage signals;
second summing means having said error signal output and said sweep voltage signal operatively coupled thereto for summing said error and sweep voltage signals to provide a control signal output operative to control the amount of heat supplied to said device.

7. The circuit of claim 1 and further including; clamping means coupled between said sweep voltage signal generating means and said second summing means and operative to cause said sweep voltage signal to reach and maintain a predetermined limit.

8. The circuit of claim 6 and further including; clamping means operatively coupled between said sweep voltage signal generating means and said second summing means and operative to cause said sweep voltage signal to reach and maintain a predetermined limit.

* * * * *